(12) United States Patent
Sjönell

(10) Patent No.: US 7,394,355 B2
(45) Date of Patent: Jul. 1, 2008

(54) VEHICLE COLLISION DETECTOR

(76) Inventor: Göran Sjönell, Asknikevägen 11, SE-181 46 Lidingö (SE)

( * ) Notice: Subject to any disclaimer, the term of this patent is extended or adjusted under 35 U.S.C. 154(b) by 85 days.

(21) Appl. No.: 10/588,242

(22) PCT Filed: Feb. 2, 2005

(86) PCT No.: PCT/SE2005/000135

§ 371 (c)(1),
(2), (4) Date: Nov. 3, 2006

(87) PCT Pub. No.: WO2005/073754

PCT Pub. Date: Aug. 11, 2005

(65) Prior Publication Data

US 2007/0126563 A1    Jun. 7, 2007

Related U.S. Application Data

(60) Provisional application No. 60/541,412, filed on Feb. 2, 2004.

(51) Int. Cl.
*B60Q 1/00* (2006.01)

(52) U.S. Cl. .................. 340/435; 340/436; 340/438; 180/271; 250/338.1; 250/339.01; 348/118; 348/148; 342/70

(58) Field of Classification Search .................. 340/435, 340/425.5, 506, 555, 600, 903, 942, 524; 180/271; 250/338.1, 339.01, 221, 222.1, 250/224; 348/118, 148; 342/70

See application file for complete search history.

(56) References Cited

U.S. PATENT DOCUMENTS 3,568,144 A    3/1971    Streb (Continued)

FOREIGN PATENT DOCUMENTS

| DE | 2143406 | | 4/1972 |
|----|---------|---|--------|
| DE | 2455733 | A1 | 5/1976 |
| EP | 0370965 | A2 | 5/1990 |
| FR | 2591351 | | 6/1987 |
| FR | 2613080 | | 9/1988 |
| GB | 2265744 | | 10/1993 |
| GB | 2283874 | A | 5/1995 |
| JP | 9132094 | A | 5/1997 |
| WO | 90/13103 | A1 | 11/1990 |
| WO | 95/25322 | | 9/1995 |
| WO | 98/34131 | A1 | 8/1998 |
| WO | 0145067 | | 6/2001 |

OTHER PUBLICATIONS

JP 9132094 A (Nissan Motor Co. Ltd.), May 20, 1997 (abstract).
JP 9132094 A (Nissan Motor Co. Ltd.), Sep. 30, 1997 (abstract).

*Primary Examiner*—Davetta W. Goins
*Assistant Examiner*—Sisay Yacob
(74) *Attorney, Agent, or Firm*—Ware, Fressola, Van der Sluys & Adolphson LLP

(57) ABSTRACT

A collision prevention detector (22), and a method therefor, to be mounted on a vehicle (10), transmits a sequence of transmissions of IR signals. The signals are transmitted in sequences alternating between at least one at the right and to the left positioned LED (24, 26, 34, 36), when both signals provide a return/reflected signal to IR-receiver an object (12) is determined as present within the area/zone from the point where the transmitted signals intersect/cross. Sequencing of signals makes it possible to position a return signal from an object (12), as one of the signals has to confirm the other signal to provide a warning signal. Moreover, a first set of LED's detects objects in a near-field zone (40) of the vehicle, and a second set detects objects beyond the first field in a far-field zone (42), whereby at least two sets of the LED's are positioned to the right and to the left.

20 Claims, 5 Drawing Sheets

U.S. PATENT DOCUMENTS

| | | |
|---|---|---|
| 3,732,536 A | 5/1973 | Larka et al. |
| 4,818,887 A | 4/1989 | Weishaupt et al. |
| 5,291,261 A | 3/1994 | Dahl et al. |
| 5,793,325 A | 8/1998 | Yamada |
| 5,929,785 A | 7/1999 | Satonaka |
| 6,157,892 A | 12/2000 | Hada et al. |
| 6,246,949 B1 | 6/2001 | Shirai et al. |
| 6,269,307 B1 | 7/2001 | Shinmura et al. |
| 6,281,786 B1 | 8/2001 | Adachi et al. |
| 6,377,167 B1 * | 4/2002 | Juds et al. .................. 340/435 |
| 6,744,353 B2 | 6/2004 | Sjonell |
| 6,816,084 B2 * | 11/2004 | Stein .......................... 340/903 |

* cited by examiner

VEHICLE COLLISION DETECTOR

CROSS REFERENCE TO RELATED APPLICATION

This application claims the benefit of priority from provisional U.S. Application Ser. No. 60/541,412 filed on Feb. 2, 2004.

TECHNICAL FIELD

The present invention pertains to a collision prevention detector and a method therefore, to be mounted on a vehicle, transmitting a sequence of transmissions of IR signals. The signals are transmitted in sequences alternating between at least one at the right and to the left positioned LED, when both signals provide a return/reflected signal to an IR receiver an object is determined as present within the area/zone from the point where the transmitted signals intersect/cross. A sequencing of signals makes it possible to position a return signal from an object or vehicle, as one of the signals has to confirm the other signal to provide a warning signal.

BACKGROUND ART

Statistics show that approximately 20% of all accidents are related to lack of vision in the "Dead Angle" or "Blind Spot" of a vehicle. This means that approximately 800.000 accidents in the western world are related to this cause every year. Impacts of this category, diagonally from behind and by surprise cause serious damage to vehicle passengers traveling in the cars involved in accidents.

A lack of vision in the dead angle or blind spot is a serious traffic and security problem, which up to date has not been presented a technically satisfactory solution. The course of events, when a vehicle is impacted from behind, laterally or diagonally is often causing serious damage to passengers. These types of impacts conventionally cause a rotation movement which in its turn often dislocates the driver and passengers from their normal position in the seats and hence diminish effects from seat-belts and airbags. This leads to risks for severe damage and high risks for disabilities and paralysis.

Much has been accomplished over the years to improve the range of vision for the driver of a vehicle. Although, the blind spot or the dead angle still constitutes a problem. Solutions introduced up to now have not achieved a clear cut aid for specific detection of other vehicles in for instance the blind spot. Some of the solutions are technically too complicated and hence too expensive to be attached as a feature on standard vehicles.

Spherical mirrors or divided mirrors have not provided the desired results either. When addressing the issue of blind spot detection it is very important to take into consideration the human capacity of perception and interpretation of an image in a question of instants. The image or traffic scenario perceived with a glimpse in the rear mirrors must be clear and not exposed to second thoughts, doubts or interpretation problems. A warning should hence only comprise what is not seen or perceived at longer distances in the mirror. An overlapping, interfering or unclear information will only confuse, cause doubts and eventually an erratic maneuver by the driver, e.g., two images of the same vehicle. A device that provides warning signals for vehicles clearly seen in the rear mirror, will eventually on one hand create false positives. The driver believes that the vehicle(s) seen in the mirror are causing the alarm, while an unseen vehicle is located in the blind spot. On the other hand there is a risk that a device with longer detection area will diminish the frequency of looking in the mirrors, since drivers eventually will rely on the warning device. A warning device should not replace frequent looks in the mirror. This will increase risks and deteriorate traffic security rather than improve security.

By cross analyzing available statistics it is although fair to assume that approximately 20% of accidents involving personal injury are related to the blind spot problem. This means that approximately 250.000 accidents per annum in the EU are related to blind spot situations. This figure extrapolated to the rest of the western world and Japan would give an approximate of 800.000 accidents pro year.

Systems utilized for preventing collision, include those using video camera detection, which suffer sever drawbacks by not being able to measure distances.

The applicant of the present invention holds the Swedish Patent with the publication No. 520 360, which concerns blind spot detection combined with wheel angle detection compared to vehicle speed, and vehicle direction indications for trigging an alarm. This patent corresponds to the international application PCT/SE00/02564 with publication No. WO 01/45067.

It is appreciated that the detector of the present invention is not restricted to a blind spot detector, but also covers detectors for sensing objects in front of a vehicle and when reversing it. Furthermore, the detector can be mounted on the side of a vehicle or at any suitable place on a vehicle in order to perform as an object detector.

SUMMARY OF THE INVENTION

The collision prevention detector also encompassing a blind spot detector (BSD) presents a solution that provides a secure and precise warning device to a vehicle driver for perception of other vehicles in front of the vehicle, when reversing the vehicle and in the blind spot area so that accidents can be avoided.

The present invention thus sets forth a collision prevention detector to be mounted on a vehicle, transmitting a sequence of transmissions of IR signals. The signals are transmitted in sequences alternating between at least one at the right and to the left positioned LED, when both signals provide a return/reflected signal to IR-receiver an object is determined as present within the area from the point where the transmitted signals intersect/cross. Sequencing of signals makes it possible to position a return signal from an object or vehicle, as one of the signals has to confirm the other signal to provide a warning signal. The detector of the present invention further comprises:

at least two sets of the LED's positioned to the right and to the left, whereby a first set detects objects in a near-field zone of the vehicle, and a second set beyond the first field in a far-field zone;

a processor/µC connected to the detection of near-and far-fields and being provided the vehicle speed; and a comparator connected to or comprised in the processor, which compares the vehicle speed with a pre-determined loss of measured distance by measuring how fast the vehicle approaches the object by closing in from a far-field zone to a near-field zone, whereby an alarm is given through an indicator device mounted on the vehicle alerting a vehicle driver to pay attention to the closing in of an approaching object.

One embodiment of the present invention comprises that it can be used as a rear mirror mounted blind spot detector, a vehicle front mounted detector, a vehicle rear mounted detector, a vehicle side mounted detector, and a vehicle roof mounted detector.

Another embodiment comprises that the detector is mounted within at least one of a headlight and a rear light of the vehicle.

A further embodiment comprises that there are further sets of far-zone LED's detecting beyond the second far-zone LED's.

A still further embodiment comprises that the vehicle is automatically braked controlled by the processor if an object is closing in at a calculated breaking distance for the speed of the vehicle regarding detectors which are vehicle front mounted detector, or vehicle rear mounted when reversing, thus detecting objects when the vehicle closes in on objects in front of it and when it reverses.

Yet another embodiment comprises that the processor is connected to the vehicle trip computer providing for instance road temperatures. Furthermore, the processor can be connected to a GPS (Global Positioning System) and take the vehicle 10 position into account when calculating distances and other parameters received from an approaching object.

A yet further embodiment comprises that the processor is connected to a rain sensor, antiskid system, anti-spin system and other like systems providing road condition information utilized to calculate when a vehicle should brake.

The present invention also sets forth a method for a collision prevention detector to be mounted on a vehicle, transmitting a sequence of transmissions of IR signals. The signals are transmitted in sequences alternating between at least one at the right and to the left positioned LED, when both signals provide a return/reflected signal to IR-receiver an object is determined as present within the area from the point where the transmitted signals intersect/cross. Sequencing of signals makes it possible to position a return signal from an object or vehicle, as one of the signals has to confirm the other signal to provide a warning signal. The detector of the present invention thus performs the steps of:

a first set detecting objects in a near-field zone of the vehicle, and a second set detecting objects beyond the first field in a far-field zone, whereby at least two sets of the LED's are positioned to the right and to the left;

a processor being provided the vehicle speed and connected to the detection of near- and far-fields; and a comparator connected to or comprised in the processor comparing the vehicle speed with a pre-determined loss of measured distance by measuring how fast the vehicle approaches the object by closing in from a far-field zone to a near-field zone, whereby an alarm is given through an indicator device mounted on the vehicle alerting a vehicle driver to pay attention to the closing in of an approaching object.

Further embodiments of the present inventions method are set forth through the attached set of dependent method claims, which in part reassemble the above provided detector embodiments.

BRIEF DESCRIPTION OF THE DRAWINGS

Henceforth the present invention is described through embodiments and examples, whereby reference is had to the accompanying drawings for a better understanding of the present invention, wherein.

DETAILED DESCRIPTION OF PREFERRED EMBODIMENTS

During development of the present invention the conclusion has been established that a blind spot warning device should be strictly limited to the blind spot and its nearest surrounding in order to fulfill the requirement of a safety device. An uncomplicated technology with low risk of failure, easy to adapt in different mirror housings, headlights, rear lights, or any other suitable position on a vehicle with a low cost would be appreciated as provided by the present invention. Moreover, it provides clear cut detection in the blind spot overcoming false positives, doubtful images, and providing an instant warning through a simple function with a clear message: WARNING! There is something in the Blind Spot, DO NOT TURN!

Prototypes of the present invention have been tested with excellent results. But there is a lack of specific statistics on blind spot related accidents, and it does not exist in official statistics. The detector of the present invention is supplementary, and does not interfer with other security systems. It can easily be attached to vehicles such as cars, trucks and buses. The present invention detector provides a preventive safety approach to vehicle safety in order to avoid accidents; while most safety features on cars are approaching safety in case of an accident. Moreover, the detector system of the present invention is based on human behavior science and a health care vision adapted to vehicle technology.

Figure 1:
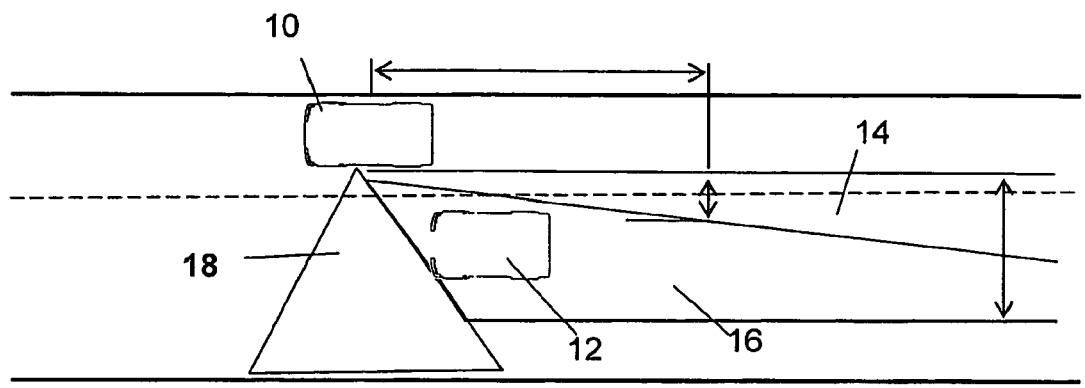
FIG. 1 illustrates how the blind spot area is defined by example of a subject vehicle and a target vehicle.

FIG. 1 illustrates how the blind spot area 16 is defined by example of a subject vehicle 10 and a target vehicle 12, whereby the subject vehicle will be provided with a blind spot detector in accordance with the present invention to avoid dangerous collision situations. The actual sight of the driver through the rear view mirror in subject vehicle 10 is defined by the area 14 in accordance with UE directive 71/127, and the driver side view is defined by the area 18. Target vehicle 12 is thus in the blind spot area 16, which will be covered by IR radiation from sequenced LED's in accordance with the present invention (not shown).

Figure 2:
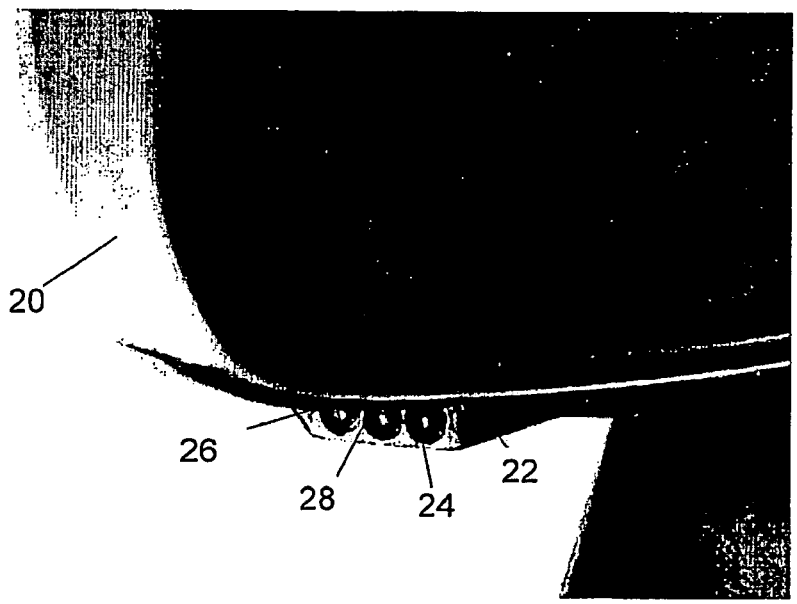
FIG. 2 illustrates one embodiment of how a detector in accordance with the present invention can be mounted on a vehicle rear view mirror.

FIG. 2 illustrates one embodiment of how a detector 22 in accordance with the present invention in its basic construction can be mounted on a vehicle rear view mirror 20. The detector is equipped with a left LED 24 and a right LED 26, which are fired in sequence and detect objects by receiving reflected IR radiation through the receiver 28. A detection of an object is accomplished when the object is hit where both emitted rays from LED's 24 and 26 intersect or cross each other. This will be elucidated further with reference to FIGS. 4-6.

Figure 3:
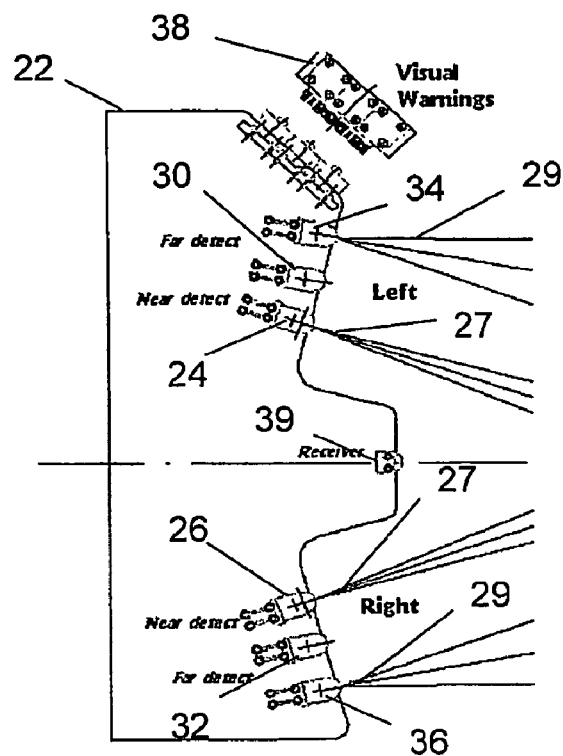
FIG. 3 illustrates how IR beam radiating LED's are mounted to create two detection zones for objects in accordance with one embodiment of the present invention.

FIG. 3 illustrates how IR beam radiating LED's are mounted, view from above, to create two detection zones for objects in accordance with one embodiment of the present invention. The detector 22 LED 24 constitutes one to the left near field radiating IR emitter, radiating pulsed beams 27, and the LED 26 constitutes the right near field radiating IR emitter, radiating pulsed beams 27. The LED's 24, 26 radiate pulses in sequence. In a like manner LED's 34 and 36 constitute the far field radiating emitters, emitting pulsed beams 29. Moreover, a receiver 39 for reception of reflected radiation against an object is depicted, and an alarm indicator 38 indicating a visual or sounding alarm to the driver of a subject vehicle 10. Receivers 30 and 32 in FIGS. 3 and 4 are measuring the reception of light in order to adjust the radiation power in different weather conditions such as greater power in bright sunshine and when the lenses of the LED's are covered with dirt.

Figure 4:
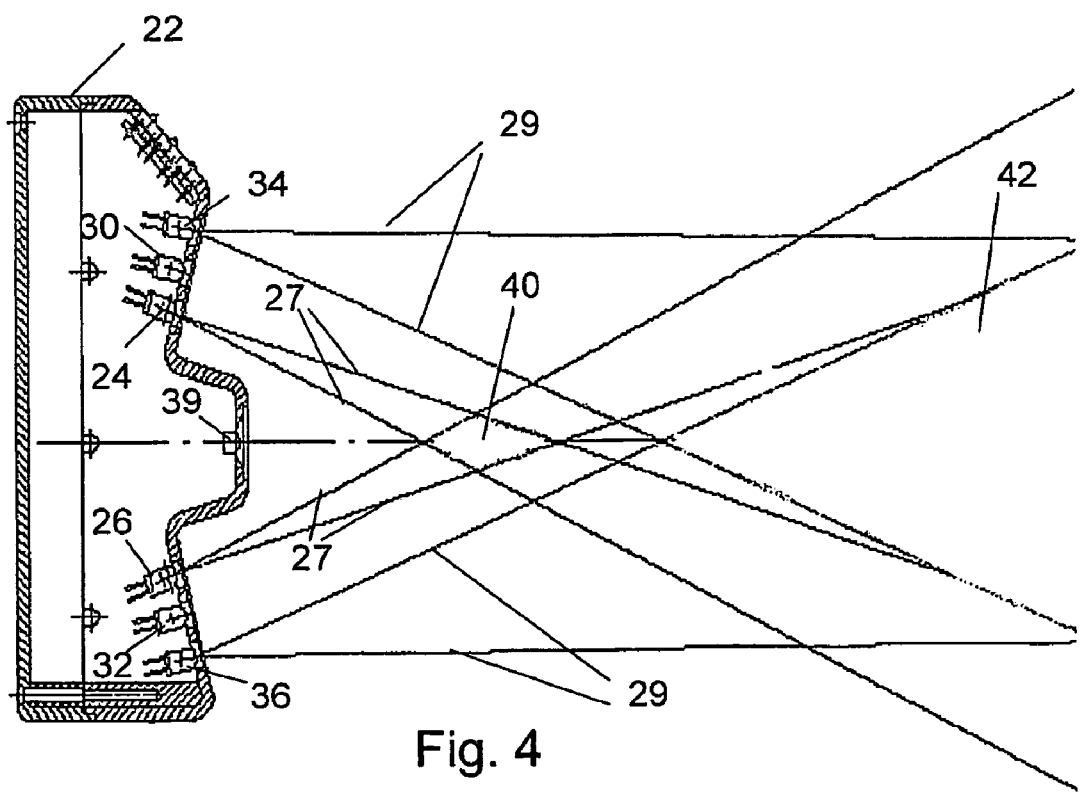
FIG. 4 illustrates one embodiment of how a first and a second zone in accordance with the present invention are created.

FIG. 4 illustrates one embodiment of how a first and a second zone 40, 42 in accordance with the present invention are created by a detector 22 as in FIG. 3.

When beams from the LED's intersect they make up an area 40 or a first zone for the near field LED's 24, 26 radiation, and an area or second zone 42 with radiation from the far field LED's 34, 36. When an object is within a zone 40, 42 it is detected as the beams 27 and 29 respectively, intersect themselves, thus being reflected from an object within the zones 40, 42.

In one embodiment of the invention it comprises that the LED's 24, 26, 30, 32 can be mounted on stands, and thus adjusting the LED's and their stands by for instance stepper motors or the like for ranging the zones 40, 42 between near and far zones.

The radiation making up the zones is of course adjusted to hit a target at different distances suitable for object detection depending on the type of vehicle, and also directed in such a manner that they cover the blind spot area 16 when the detector is utilized as a BSD.

Figure 7:
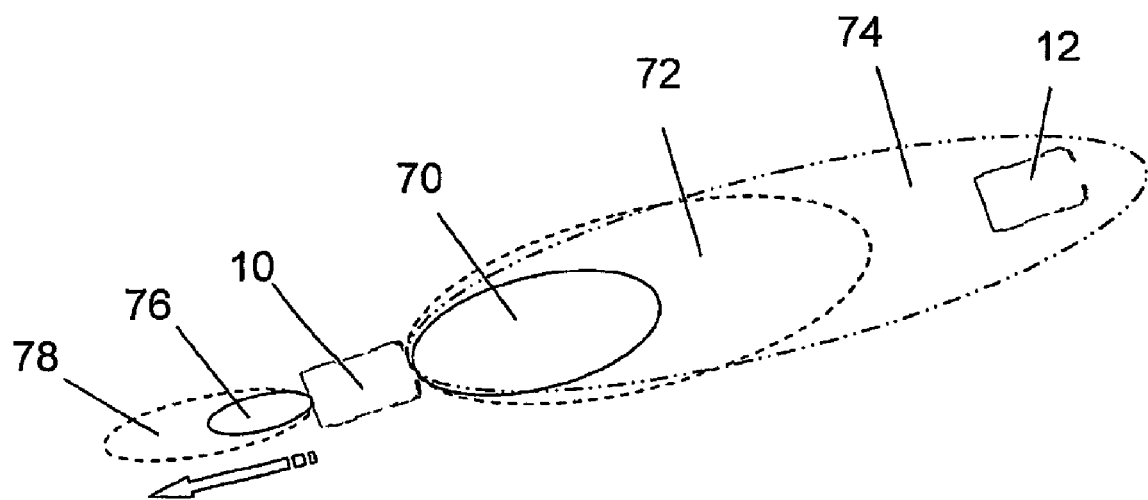
FIG. 7 illustrates three zones for detection of objects when a subject vehicle is moving forward approaching a target vehicle in front of it, and zones for detection when reversing a vehicle.

Different alarm and/or warning indications and/or signals could be provided to the driver of subject vehicle in zones 1 and 2, with for instance a much more powerful indication when an object moves from zone 2 to zone 1, i.e., closer to the subject vehicle 10. It is appreciated that the present invention includes embodiments with more than two zones, for example, with multiple far field zones as depicted in FIG. 7.

In the following description, the functioning of one embodiment of a signaling scheme for a blind spot detector of the present invention is described. It is appreciated that the present description concerns one possible embodiment of the invention out of many.

The detector system has two microprocessors in one embodiment of the present invention, one for the emission part (PIC 16C54), and the other one for the detection part, to check the messages/pulsed signals, signals enables, and alarms activation (PIC16C63) that it will be the master. An adequate logic communication is acquired between the two microprocessors, so the protocol to accomplish the communication must be defined. The communication between the µC's will be in parallel and the sequence to emit has 4 bits and they will be transmitted through the PortB in the main µC.

Every time the emitter emits a message, the emission µC will send to the main µC one signal to indicate the end of the emission. Then the main µC will give the order to change to the other emitter and will send a new sequence to emit. With this all the orders are centralized in the main µC, whereby it is always in control of what is taking place.

The main µC will be operating until it detects an interrupt generated by a capture module, which implicates that there is a detection, and thus the µC performs its detection routine, checking if there are any objects in the detection area/zone and enabling corresponding alarms.

The protocol has been defined in accordance with the behavior and response of the IR receiver U2538 from Temic®, whereby every emission is defined as follows and depicted in FIG. 5. It has to provide combinations of the signal in FIG. 5, to define the high state signal "1" and the low state signal "0". Following this, the low state signal is defined like one emission plus zeros during the same time as one emission, and the high state signal like one emission followed by another emission. Hence, the signals of every level (high or low) are as depicted in FIG. 6, where a low state "0" is depicted as the upper signal in FIG. 6 and a high state "1" as the lower signal in FIG. 6.

Figure 5:
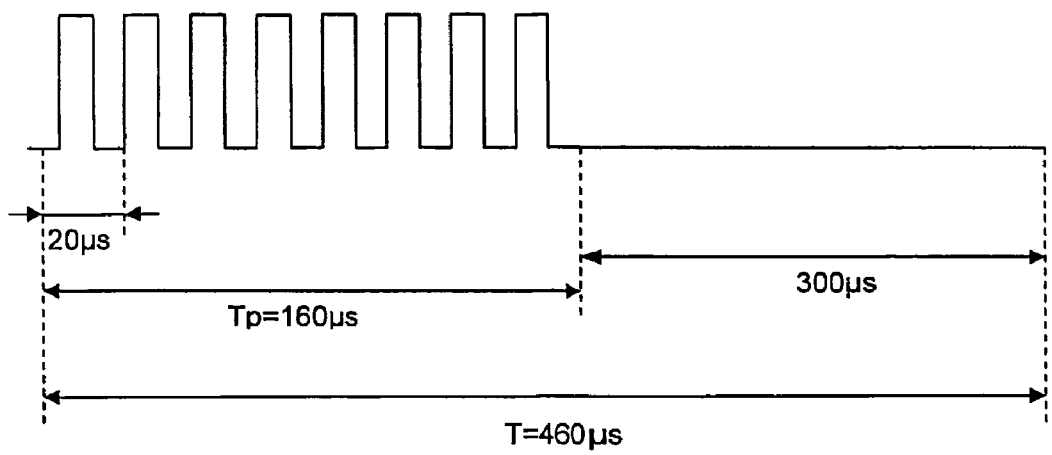
FIG. 5 illustrates one embodiment of a modulated pulse emitted by the LED's of the present invention.
Figure 6:
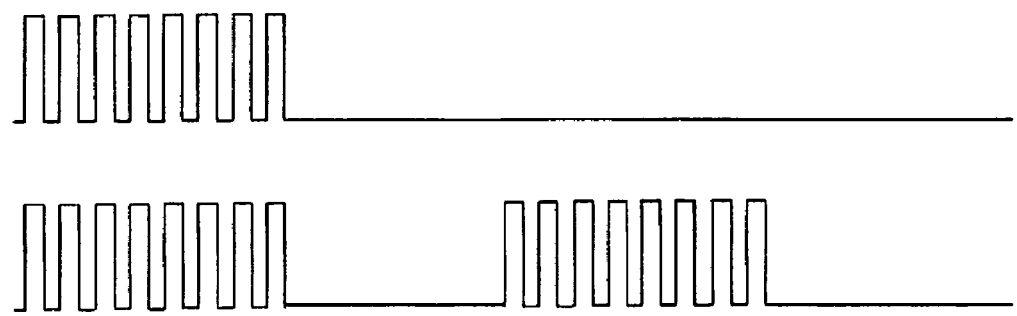
FIG. 6 illustrates how a digital "1" and "0" is transmitted in a pulse train in accordance with an embodiment of the present invention.

It can be seen in FIG. 5 that every emission has a duration of 460 µs, but every bit has a duration of 920 µs because every bit is composed by two emissions. Every message emitted by one emitter has 4 bits 920 µs=3,68 ms. Every message is sent one time by one emitter and after this, the µC will generate another random sequence to send a further message by the second emitter. When the two emitters each have sent a message a scanning of the detection area/zone or blind spot area is accomplished. Hence, the total duration of one complete scan involves two messages 3,68 ms=7,36 ms.

A correct emission and detection of the first emitter and the second emitter simultaneously form one complete message. One complete message has a duration of 10 ms, following this time the µC emits a new message/scan. The scanning frequency in one embodiment is 100 scans in one second.

According to one embodiment of the present invention it is possible to display a brief picture on for instance a screen, LCD display or the like, shown to the driver of a vehicle of an object scanned within a zone.

Henceforth, the time periods are defined which have to be met before alarms are activated when the detection messages/signals/scans are correctly received. A warning will be activated after reception of one complete correct message. Once the warning is activated and the corresponding enable signals are detected, the corresponding level of the danger signals will be activated, for example, after 3 continuous warnings in one embodiment. All provided alarms are kept activated during a time of 2 s when they have been activated, and afterwards, if there is not any other correct detection of an object, they will be disabled.

FIG. 7 illustrates three zones 70, 72, 74 for detection of objects when a subject vehicle 10 is moving forward approaching a target vehicle 12 in front of it, and two zones 76, 78 for detection when reversing a vehicle 10. The arrow in FIG. 7 depicts a reversing vehicle 10. It probably makes more sense to equip a truck or lorry with detectors for reversing to be utilized when for instance approaching a loading bridge. It is appreciated that detectors 22, which cover forward and rear detection of objects in approaching a vehicle 10 or the vehicle 10 approaching them, can have multiple detectors 22 attached in a stack and adjusted to cover multiple near-field and/or far-field zones 40,42. Otherwise, it is possible to attach detectors 22 in a manner that is most suitable to the type of vehicle, which should be obvious for a skilled person.

In an embodiment of the present invention the vehicle 10 could be equipped with for example a wild animal anti collision button, "moose" button. Pushing the button disengages for instances the zones 70 and 72 keeping zone 74 far enough in front of the vehicle 10 to warn when animals are detected.

Figure 8:
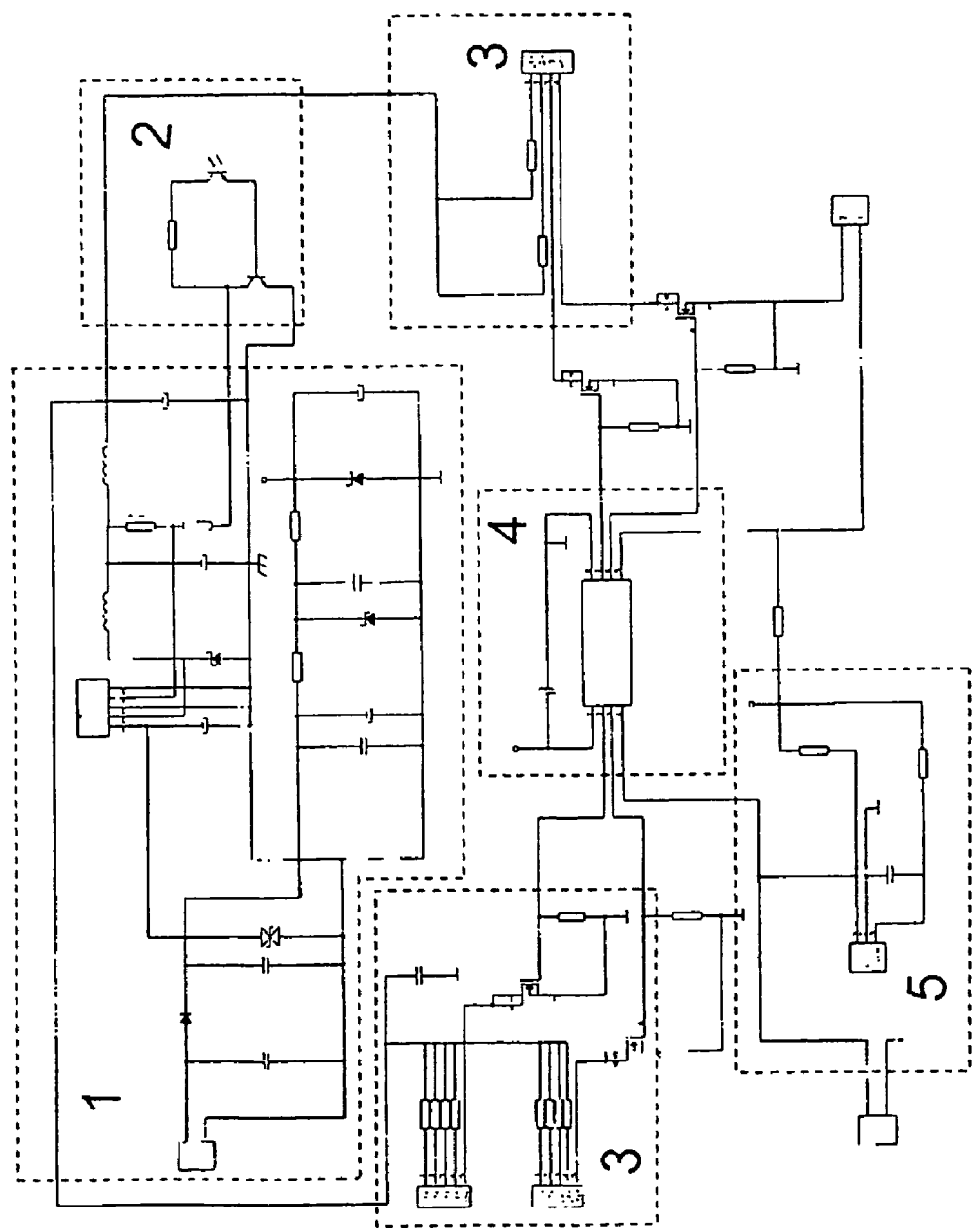
FIG. 8 illustrates a circuit diagram of one embodiment of a detector in accordance with the present invention.

The circuit drawing of FIG. 8 comprises blocks 1-5. In FIG. 8, blocks 1-5, within broken lines, are depicting one possible embodiment of a detector in accordance with the present invention. Henceforth the blocks of FIG. 8 are explained.

Block 1 (Power Supply)

The comprised voltage, in this case 12 V, but vehicle voltages systems such as 6 V, 24V and other possible can be utilized in further embodiments of the present invention, is converted to 5 V, whereby a number of filters provide a constant voltage of 5 V. It is necessary in this embodiment that an IR-system is provided a constant voltage of 5 V so that the functionality is not jeopardized by variations in voltage.

Block 2 (unit$_{13}$ regulating IR-transmission)

Block 2 depicts a unit utilized to regulate (control) the emission from IR-LED's depending on external light conditions. In blazing sunshine, a strong signal is utilized and during darkness a weaker signal. This unit provides that the signal strength is adapted to the external light conditions. This also means that if the LED's become dirty the blind spot detector can regulate/adapt the signal strength to such conditions in one embodiment of the present invention.

Block 3 (Transmitting Unit; Note that there are Two Block 3 in the FIG. 8)

Multiple pairs of LED's could be utilized depending on the number of search fields in the blind spot area. For example, one search field can have a distance for searching of 2-4 meters, another, a distance of 4-8 meters and so on.

Additionally, in one embodiment, these search fields can be arranged so that warning signals are provided when a vehicle is entering the blind spot area, is within the area, and is leaving the area.

The width of the search field is determined by the optics of the LED's utilized, through the sector angle within a beam of light and the angle between beams of light, and through the power of transmission of a transmitted IR signal.

Block 4 (Microprocessor)

The microprocessor controls the transmission and reception of light, and the following functioning.

A sequence of transmissions of IR signals. The signals are transmitted in sequences alternating between a right and to the left positioned LED. If both signals provide a return/reflected signal to the receiver an object such as a vehicle is determined as present behind the point where the transmitted signals intersect/cross, i.e., for instance the blind spot area. The sequencing of signals makes it possible to position a return signal from an object or vehicle, as one of the signals has to confirm the other signal to provide a warning signal.

The microprocessor determines whether or not a received signal should trigger a warning. In order to trigger a warning signal, both the confirming signals/light beams must be reflected by the same object. Hence, the microprocessor is sorting out all fake/false positive signals/beams, i.e., return signals to the receiver, which signals are not confirmed by an intersecting or crossing signal.

The functioning of the microprocessor can be multiplied to a number of pairs of LED's and by programming the microprocessor the sequencing of the multiple search fields can be determined.

Also provided in the microprocessor, in an embodiment, there are functions such as an interface/connection to direction indicators, speed of the vehicle, wheel angle of the vehicle and other functions to optimize the functionality of the blind spot detector warning device of the present invention.

Some advantages of the present invention concern that it provides a reduced number of fake/false positive warnings of blind spot objects and other front end objects. The components utilized in the detector have a life span that widely exceeds the life span of a vehicle. For example a LED conventionally has a life span of 100.000 hours. A car that is driven 30.000 km on a yearly basis with a mean speed value of 70 km/h has to reach 70 years of age before vital components of the detector fail. There is little risk for hazardous behavior when utilizing the present invention and it is built up of standard components, thus being very economic in manufacturing.

Furthermore, the present invention has small dimensions and is simple to attach, for example, in the housing of a vehicle rear view mirror. A basic technique is the same for any kind of vehicle. Only the optics are to be adjusted/adapted to the vehicle outer dimensions and its dead spots, respectively, for different models of vehicles.

Although, IR emission is utilized to describe the present invention, it is not restricted to this use. Other electromagnetic radiation could be considered such as laser semi conductor radiation.

The present invention is not limited to given examples and embodiments, but to the attached set of claims that define further embodiments to a person skilled in the art.

What is claimed is:

1. A collision prevention detector to be mounted on a vehicle, transmitting a sequence of transmissions of IR signals, whereby the signals are transmitted in sequences alternating between at least one at the right and to the left positioned LED, when both signals provide a return/reflected signal to an IR-receiver an object is determined as present within an area from the point where the transmitted signals intersect/cross, whereby the sequencing of signals makes it possible to position a return signal from the object, as one of the signals has to confirm the other signal to provide a warning signal, said detector further comprising:

at least two sets of said LED's positioned to the right and to the left, whereby a first set detects objects in a near-field zone of the vehicle, and a second set beyond said first field in a far-field zone;

a processor connected to said first and second sets for detection of near-and far-field zones and being provided the vehicle speed; and a comparator connected to or comprised in said processor, which compares the vehicle speed with a pre-determined loss of measured distance by measuring how fast the vehicle approaches said object by closing in from the far-field zone to the near-field zone, whereby an alarm is given through an indicator device mounted on said vehicle alerting a vehicle driver to pay attention to the closing in of an approaching object.

2. A detector according to claim 1, wherein the detector can be a rear mirror mounted blind spot detector, a vehicle front mounted detector, a vehicle rear mounted detector, a vehicle side mounted detector, and a vehicle roof mounted detector.

3. A detector according to claim 2, wherein the detector is mounted within at least one of a headlight and a rear light of said vehicle.

4. A detector according claim 1, further comprising further sets of far-zone LED's detecting beyond said second far-zone LED's.

5. A detector according to claim 1, wherein said vehicle is automatically braked controlled by said processor if an object is closing in at a calculated breaking distance for the speed of the vehicle regarding detectors which are vehicle front mounted detectors, or vehicle rear mounted when reversing, thus detecting objects when the vehicle closes in on objects in front of it and when it reverses.

6. A detector according to claim 5, wherein said processor is connected to a vehicle road computer providing road temperatures.

7. A detector according to claim 5, wherein said processor is connected to a rain sensor, antiskid system, anti-spin system and other like systems providing road condition information utilized to calculate when to brake said vehicle.

8. A detector according to claim 1, wherein the width of a search field zone is determined by the optics of the LED's utilized, through the sector angle within a beam of light and the angle between beams of light, and through the power of transmission of a transmitted IR signal.

9. A detector according to claim 1, wherein search field zones can be arranged so that warning signals are provided when a vehicle is entering a blind spot area, is within the area, and is leaving the area.

10. A detector according to claim 1, further comprising a receiver adapted to adjust the signal strength to the external light conditions and dirt on said LED's whereby a stroger signal is used during daylight conditions and a weaker signal is used during darkness.

11. A method for a collision prevention detector to be mounted on a vehicle, transmitting a sequence of transmissions of IR signals, whereby the signals are transmitted in sequences alternating between at least one at the right and to the left positioned LED, when both signals provide are turn/reflected signal to IR-receiver an object is determined as present within an area from the point where the transmitted signals intersect/cross, whereby the sequencing of signals makes it possible to position a return signal from the object, as one of the signals has to confirm the other signal to provide a warning signal, said detector performing the steps of:
  detecting objects in a near-field zone of the vehicle with a first set of LED's, and detecting objects beyond said first field in a far-field zone with a second set of LED's, whereby the two sets of said LED's are positioned to the right and to the left;
  providing a processor with the vehicle speed and connected to said first and second sets for detection of near- and far-field zones; and
  using a comparator connected to or comprised in said processor for comparing the vehicle speed with a pre-determined loss of measured distance by measuring how fast said vehicle approaches said object by closing in from the far-field zone to the near-field zone, whereby an alarm is given through an indicator device mounted on said vehicle alerting a vehicle driver to pay attention to the closing in of an approaching object.

12. A method according to claim 11, wherein the detector can be a rear mirror mounted blind spot detector, a vehicle front mounted detector, a vehicle rear mounted detector, a vehicle side mounted detector, and a vehicle roof mounted detector.

13. A method according to claim 11, wherein the detector is mounted within at least one of a headlight and a rear light of said vehicle.

14. A method according to claim 11, further comprising the step of providing further sets of far-zone LED's detecting beyond said second far-zone LED's.

15. A method according to claim 11, wherein said vehicle is automatically braked controlled by said processor if an object is closing in at a calculated breaking distance for the speed of the vehicle regarding detectors which are vehicle front mounted detector, or vehicle rear mounted when reversing, thus detecting objects when the vehicle closes in on objects in front of it and when it reverses.

16. A method according to claim 15, wherein said processor is connected to the vehicle road computer providing road temperatures.

17. A method according to claim 15, wherein said processor is connected to a rain sensor, antiskid system, anti-spin system and other like systems providing road condition information utilized to calculate when to brake said vehicle.

18. A method according to claim 11, wherein the width of a search field zone is determined by the optics of the LED's utilized, through the sector angle within a beam of light and the angle between beams of light, and through the power of transmission of a transmitted IR signal.

19. A method according to claim 11, further comprising the step of arranging search field zones so that warning signals are provided when a vehicle is entering a blind spot area, is within the area, and is leaving the area.

20. A method according to claim 11, further comprising the step of adapting the signal strength to the external light conditions and dirt on said LED's whereby a stronger signal is used by daylight conditions and a weaker signal is used during darkness.

* * * * *